United States Patent [19]

Turner

[11] 4,390,384
[45] Jun. 28, 1983

[54] METHOD AND APPARATUS FOR BONDING THERMOPLASTIC MATERIALS

[75] Inventor: E. Wayne Turner, Deerfield, Mass.

[73] Assignee: Hardigg Industries, Inc., South Deerfield, Mass.

[21] Appl. No.: 322,580

[22] Filed: Nov. 18, 1980

Related U.S. Application Data

[63] Continuation of Ser. No. 63,926, Aug. 6, 1979, abandoned, which is a continuation of Ser. No. 862,559, Dec. 20, 1977, abandoned.

[51] Int. Cl.³ .............................................. B29C 19/00
[52] U.S. Cl. ................... 156/221; 29/623.1; 29/623.2; 29/623.4; 156/157; 156/292; 156/304.2; 156/304.6; 156/308.2; 156/309.6; 156/309.9; 156/311; 156/312; 156/322; 156/497; 156/498; 156/502; 156/535; 156/583.2; 264/237; 264/248; 264/345; 264/348; 428/35; 428/58; 429/176
[58] Field of Search ............... 156/157, 311, 221, 312, 156/292, 322, 304.2, 497, 304.6, 498, 308.2, 502, 309.6, 535, 309.9, 583.2; 264/237, 345, 248, 348; 428/35, 58; 429/176; 219/243; 100/93 P, 295; 29/623.1, 623.2, 623.4

[56] References Cited

U.S. PATENT DOCUMENTS

| | | | |
|---|---|---|---|
| 2,520,737 | 8/1950 | Romeyn et al. | 156/309.6 |
| 3,276,941 | 10/1966 | Burns | 156/304.2 |
| 3,384,527 | 5/1968 | Fener | 156/502 |
| 3,429,854 | 2/1969 | Siggel et al. | 264/348 |
| 3,458,380 | 7/1969 | Kipp | 156/309.6 |
| 4,118,265 | 10/1978 | Harsigg | 156/292 |

FOREIGN PATENT DOCUMENTS 48-11589  4/1973  Japan ................................. 156/157

Primary Examiner—John J. Gallagher
Attorney, Agent, or Firm—Cushman, Darby & Cushman

[57] ABSTRACT

A method and apparatus is disclosed for bonding two pieces of thermoplastic material to one another. The method includes the steps of heating the edges of the plastic materials to be joined to at least their fusing temperatures and then forcing the heated edge portions against one another to thereby form a bonded junction. A bead is formed along at least one edge of the junction of the plastic materials as a result of the pressure of the two plastic materials bearing against one another. The welded junction is heated, optionally at elevated pressure, to at least its fusion temperature and is then rapidly cooled. The resulting weld has a high impact and dielectric strength and has a smooth overall appearance.

15 Claims, 9 Drawing Figures

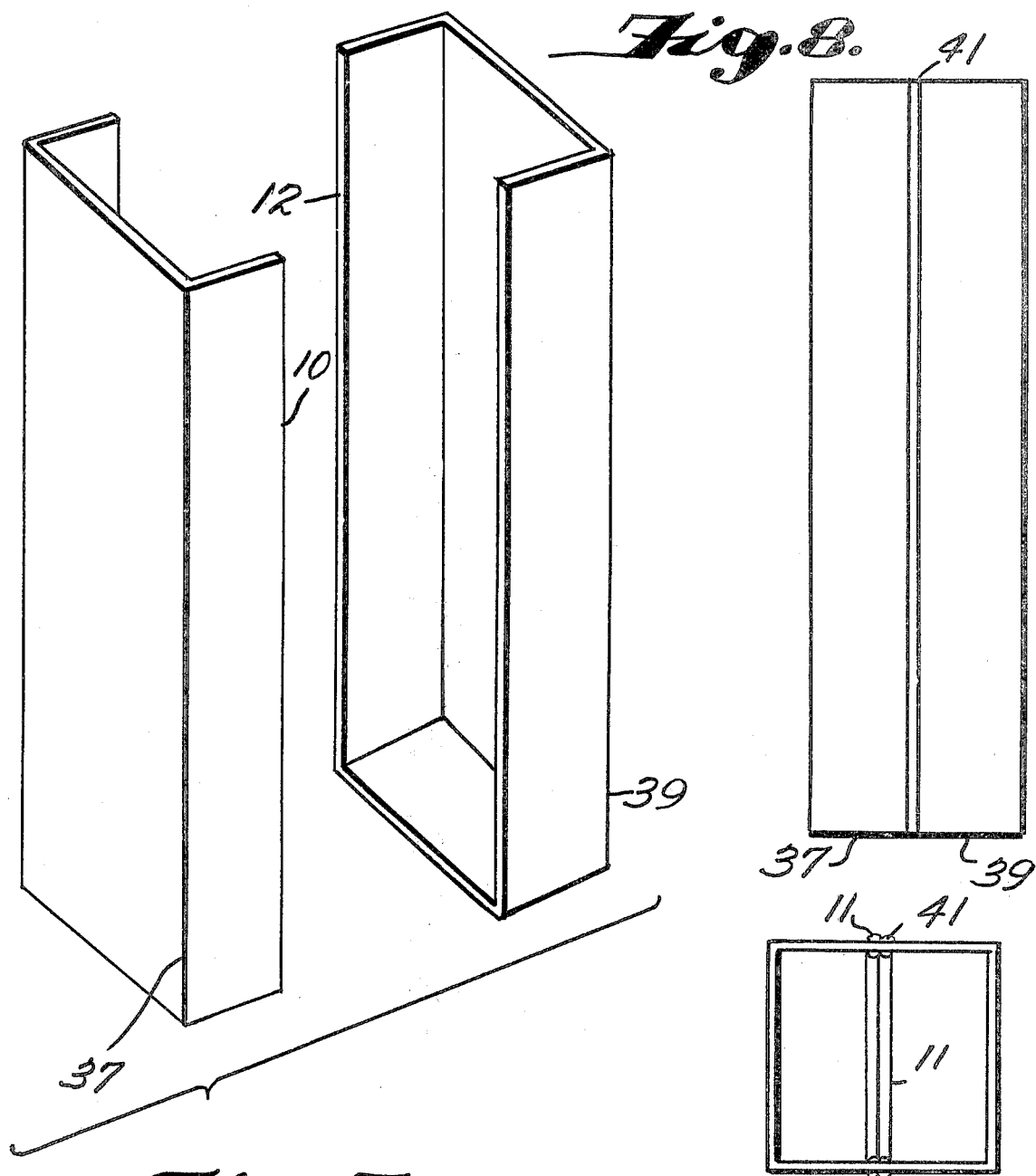

METHOD AND APPARATUS FOR BONDING THERMOPLASTIC MATERIALS

This is a continuation of application Ser. No. 63,926 filed Aug. 6, 1979, now abandoned, which is a continuation of application Ser. No. 862,559, filed Dec. 20, 1977, which is abandoned.

BACKGROUND OF THE INVENTION

This invention relates to an improved method and apparatus for bonding thermoplastic materials to one another.

Techniques for bonding thermoplastic materials to one another have been known for quite some time. Examples of such bonding techniques are described in *Welding of Plastics,* Neumann and Bockhoff, Reinhold Publishing Co., 1959, and include hot plate and friction welding. By either of these techniques, the edges of the plastic materials to be bonded are heated to bring the plastic at the edges to its fusion temperature. As soon as the edges are sufficiently heat-softened, they are quickly joined together under pressure until the melted or softened edges have cooled sufficiently to form a strong joint. During the welding operation, the pressure between the two softened edges of the thermoplastic materials should be sufficient to force out air bubbles and to bring the entire edge surfaces into intimate contact. The resulting pressure on the softened edges as they are joined together results in the formation of a rounded bead along the junction of the two thermoplastic materials. In the past after the bonded or welded edges cooled, the rounded bead was removed by sanding in an area about the juncture of the bonded edges or by cutting away the bead. This was followed by a polishing step.

In many applications, however, the integrity, reliability and durability of the weld or bond is of critical importance. As one example, when thermoplastic pipes are bonded to one another by means of a hot plate weld, it is very important that the weld have the required strength and durability in order to serve the purpose of conveying fluids under varying temperatures and pressures in an environment which may be subject to substantial vibrations. As a second example, some battery jars are formed by hot plate welding techniques. These battery jars contain a liquid electrolyte and support a series of heavy electrodes. When placed in situ, the battery jars are subjected to vibration and occasional shock impulse forces, and accordingly, the welds must be of substantial strength and durability to remain functional over a long period of time.

In order to test the integrity and reliability of these welds a number of techniques have been developed. One method is to establish a very high electromagnetic field across the weld to determine whether dielectric breakdown occurs. If there are minute pores and/or cracks in the weld, the dielectric strength of the weld will be reduced and upon establishing the electromagnetic field across the weld, a spark will be generated.

Another technique for testing the integrity and reliability of welds is to generate a mechanical impulse force against the weld to determine its resistance to fracture. In the battery jar industry this is accomplished by dropping a weighted dart from a preset distance onto the weld to generate a very high point pressure differential across the weld. Of course, other impact techniques can be used depending upon the design requirements of the finished product. These techniques for measuring the reliability and strength of welds have proven useful in many applications where the integrity of a weld joint is of critical importance.

Using these and other known testing techniques, it has been found that the formation of hot plate welds by the simple heating of the edges of the thermoplastic materials to be joined and then forcing the edges against one another to form the weld results in decreased tensile strength of the material at the weld junction; that is the tensile strength of the material at the weld junction can be 85 percent of the tensile strength of parent material and lower. In addition, the dielectric test failure rate resulting from generating a large electromagnetic field across the weld increases as much as 100 times over the dielectric test failure rate of the parent material. Further, the impact strength of such welds when tested by dropping a dart onto the weld was found to be reduced substantially over that of the parent material and in addition varied substantially at different points along the welds and from one weld to the next to thereby reduce the overall reliability of the weld. Further, the bending strength, particularly the flexural deflection, of the weld about the axis of the weld was found to be reduced substantially.

It is therefore an object of this invention to provide an improved method of bonding thermoplastic materials to one another to improve the strength and reliability of the bond.

It is another object of this invention to provide an improved apparatus for bonding thermoplastic materials to one another.

SHORT STATEMENT OF THE INVENTION

Accordingly, this invention relates to an improved method and apparatus for bonding thermoplastic materials to one another. The method comprises the steps of heating the edges of the thermoplastic materials to at least their fusion temperatures. The heated edges are then forced against one another to thereby form a welded junction. A bead is formed as a result of the pressure of the two thermoplastic materials bearing against one another with the bead being formed along the junction of the weld. Then the weld junction (1) is heated to at least about its fusion temperature, optionally at elevated pressure, and then (2) is rapidly cooled to improve the physical properties of impact strength, dielectric strength and flexural deflection of the plastic material proximate the weld junction.

The apparatus includes known equipment for heating and joining the edges of the thermoplastic materials to thereby form a welded junction. The improved apparatus of the present invention includes a strip of material which can be heated and cooled relatively rapidly. The strip which is preferably the shape of the weld junction is supported by an insulating material which has a grooved network throughout the surface thereof which supports the strip. The strip may be heated, for example, by an electric current and is cooled by drawing air from the area surrounding the strip through the groove network and out through a vacuum pump.

In operation, after forming the welded junction, the strip of material is forced against the welded junction that has been formed during the welding step and is heated to approximately the fusion temperature of the plastic material. The heated weld junction area and the strip are then rapidly cooled by drawing ambient air past the junction area and the strip through the groove network. When the plastic material has cooled sufficiently, the strip is removed from the plastic material.

BRIEF DESCRIPTION OF THE DRAWINGS

Other objects, features and advantages of the present invention will become fully apparent from the following detailed description of the preferred embodiments, the appended claims and the accompanying drawings in which:

FIG. 7 represents two end sections which can be welded together to form a battery jar;

FIG. 8 is a side elevation view of the battery jar formed by welding the two end sections depicted in FIG. 7; and FIG. 9 is a plan view of the battery jar of FIG. 8.

DETAILED DESCRIPTION OF THE INVENTION

Figure 1:
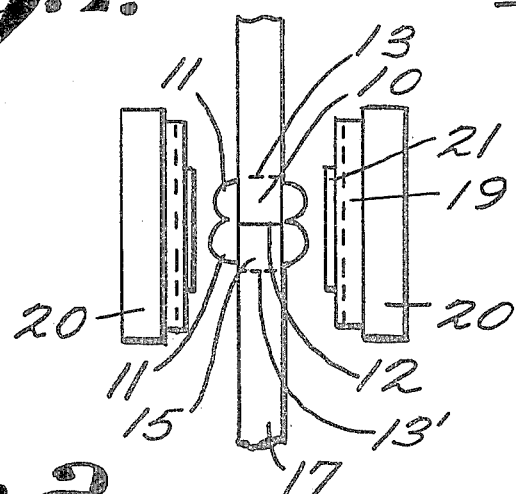
FIG. 1 is a simplied illustration of a welded joint having a rounded bead formed on each side of the weld.

In FIG. 1 there is a cross-sectional view of a weld joint formed by heating the respective edges 10 and 12 of two pieces of thermoplastic material. After the respective edges have been heated to their fusion temperature or until they become plastic, the edges are forced against one another to form a welded junction. The pressure on the molten plastic edges of the thermoplastic material resulting from forcing the edges against one another creates a rounded bead 11 on each side of the weld. The dotted lines 13 and 13' near each edge 10 and 12 illustrate, in a simplified manner, that portion of the thermoplastic material which was reheated during the welding process. Weld failure resulting from the aforementioned dart impact test procedure, frequently occurs between and along the respective boundary lines 15 between the reheated portions 13 and the non-heated portions 17 of the thermoplastic material.

Weld failure, as measured by the dart impact test procedure, indicates that the thermoplastic material at the welded junction is more brittle and less ductile, than the parent material. While decrease in tensile strength of the material at the welded junction has been noted, brittleness and loss of ductility of the material at the weld junction, compared to the parent material, are more serious side effects of the welding process. Moreover, the material at the junction is characterized by a much higher rate of dielectric test failure, according to dielectric requirements of the industry, compared to the parent material.

Various reasons for the variations in weld impact strength at the welded junctions were proposed: (1) The molecular weight distribution of the thermoplastic material might influence weld impact strength and might account for the variations; (2) the material was becoming oxidized during welding and was, therefore, more brittle; and (3) the crystalline structure of the material in and adjacent to the weld line was coarsened due to the welding heat. However, it could not be established that any one or combination of these reasons resulted in the decrease of impact strength of the thermoplastic material at the weld junction.

In accordance with the invention, it was discovered that impact strengths of the material at the welded junction could be increased and that dielectric test failure of the material at the welded junction could be substantially eliminated, (1) by heating the material at the weld junction to a temperature at least about the fusion temperature of the thermoplastic material, optionally at elevated pressure, and (2) by quickly quenching the heated junction to a temperature at least below the fusion temperature. As stated above, when welding two pieces of thermoplastic material, a bead occurs along at least one side of the welded junction. In accordance with the process of the invention, the bead can be removed prior to the steps of heating and quenching, but preferably it is not removed.

The exact temperature of heating will depend on the exact thermoplastic materials which have been welded, and, for instance, can be as low as 300° F. for branched polyethylene and can be up to 900° F. when the thermoplastic is high density polyethylene thermoplastic. That is, the exact temperature of heating will depend on the fusion temperature of the thermoplastic material, i.e., that temperature at which it becomes molten. As a practical guideline, the exact temperature of heating can be determined for a specific thermoplastic by selecting that temperature at which sufficient fusion occurs within a period of time up to about 25 seconds.

Pressure is applied to the weld junction during the step of heating or after the step of heating. The pressure must be sufficient to cause the material at the weld junction to become substantially flat. In practice, the pressure can vary widely depending on the apparatus and temperatures used and can range from 20 to 90 lb./square inch. If the bead formed at the weld junction is not removed, the pressure must be sufficient to mash the bead against the welded junction until it is substantially flat. Preferably, in the preferred embodiment pressure is applied during the heating step and the combined effect of the conditions of heat and pressure is sufficient to mash the bead until it is substantially flat.

After the pressure treatment, the heated, welded junction is immediately quenched. Quenching comprises rapidly cooling the heated, welded junction to a temperature at least below the fusion point of the thermoplastic material and preferably to a temperature at which the thermoplastic lacks adhesive properties. The quenching step is undertaken to resolidify the material at the welded junction.

Quenching must immediately follow pressure or heat-pressure treatment of the welded junction. That is, quenching in accordance with the invention does not include allowing the pressure or heat-pressure treated welded junction to cool at ambient conditions. Surprisingly, quenching after the steps of fusing the two edges of thermoplastic and joining those edges under pressure, i. e., immediately after formation of the welded junction, does in practice result in improved properties of the weld junction, with respect to dielectric properties, impact strength and flexural deflection about the axis of the weld. Quenching may be undertaken, for instance, by immersing the treated junction into water.

Figure 2:
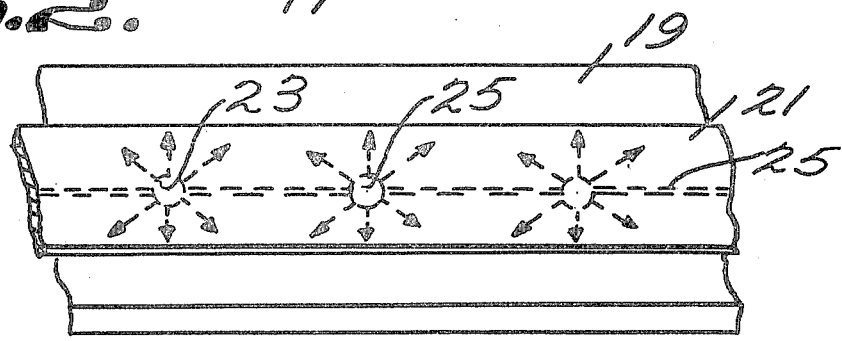
FIG. 2 is a simplified perspective view of one embodiment of the apparatus for forming an improved hot plate weld.

In order to overcome the problem of decreased tensile strength, low impact strength, high dielectric test failure rates, and the problems resulting from having a rounded bead extending along the longitudinal length of the weld, an apparatus has been developed which in its simplest form is illustrated in FIG. 2. In FIG. 2, there is illustrated an insulating strip 19 which, in the preferred embodiment, is a ceramic material or a high temperature plastic such as Torlon, a polyamide. A strip 21, preferably of Titanium Alloy 6AL4B having a thickness of 0.30 millimeter and a width of 25 millimeters, is positioned over the insulating strip 19. As will be seen, the insulating strip 19 serves the dual function of an electrical and heat insulator and as a mechanism for rapidly cooling, among other things, the strip 21.

In the annealed condition, the strip 21 has an electrical resistivity of approximately 180 micro-ohms-centimeter, excellent corrosion resistance, and a tensile yield strength of 130,000 lbs per square inch at room temperature. The high strength of the alloy is useful in resisting the local pressure forces generated when first contacting the rounded weld bead. The high strength is also useful due to the forces imposed upon the Titanium strip when subjected to high temperatures. As an example, when the Titanium strip is heated to 450°–500° F. it increases in length due to thermal expansion. On the other hand, the plastic material outside of the weld zone, i.e., the area 13, is substantially able to keep the surface area of the bead about the heated strip 21 from expanding or contracting along the weld junction during the process of mashing the bead and cooling the resulting mashed bead.

Consequently, the longitudinal expansion and contraction of the heated strip 21 results in a shear stress between the strip 21 and the weld bead material. This could lead to flaws in the surface of the plastic material and possible warpage of the plastic device being formed by the welding step. Accordingly, the Titanium Alloy strip 21 is placed under a longitudinal tensile strain at room temperature which is slightly greater than the maximum thermal strain which occurs during heating and cooling. The strain is maintained constant during the heating of the strip 21 by techniques known in the art. For instance, this strain can be effected by screws 55 and 56 in FIG. 6. In this manner each point along the alloy strip 21 remains in substantially the same location with respect to the bead during heating and cooling, and accordingly the length of the heated section of the strip 21 remains substantially constant. Since a room temperature stress of approximately 35,000 pounds per square inch is necessary to provide the necessary strain on the strip, which stress is reduced substantially under high temperature, the strength of the strip 21 must be quite high. It can be clearly seen that the 130,000 lbs/square inch tensile yield strength is more than adequate for the stress levels induced into the strip 21.

As illustrated in FIG. 1, the heated strip 21 together with its insulating support 19 is pressed against the bead 11 to cause it to fuse and become plastic. The bead is pressed and flattened against the weld area. During this operation, the fused thermoplastic material will adhere to the strip 21. After the strip is cooled below the melting point of the thermoplastic material, the adhesion of the strip to the thermoplastic material ceases and the strip can be removed from the material.

It has been discovered that the welded joint which has been heated in accordance with the invention must be rapidly quenched in order to realize the advantage of improved tensile strengths, impact strengths and dielectric properties of the material at the welded junction. Accordingly, a plurality of holes 23 are formed in the strip 21, each of the holes being in communication with one another through a trough 25 formed in the insulating support 19. In one embodiment cool air is blown through the trough 25 and out through the holes 23 about the heated thermoplastic material as illustrated by the arrows in FIG. 2. This quickly cools the thermoplastic material and the strip to thereby provide the desired crystalline structure, i.e., the mashed thermoplastic material illustrates a smooth, closed surface having a very low dielectric failure rate. The remolded weld bead forms an additional flat layer of material which becomes laminated to the parent material. Thus, the possibility of a minute flaw in the weld causing undesirable leakage is substantially reduced.

Figure 3:
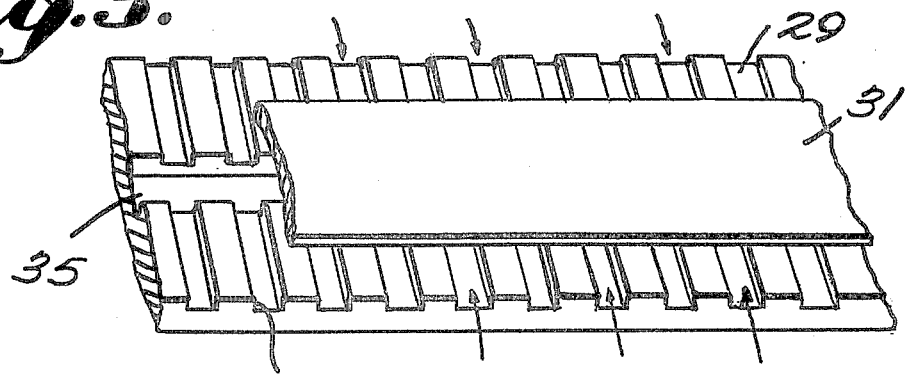
FIG. 3 is a perspective view of the preferred embodiment of the apparatus for forming an improved hot plate weld.
Figure 4:
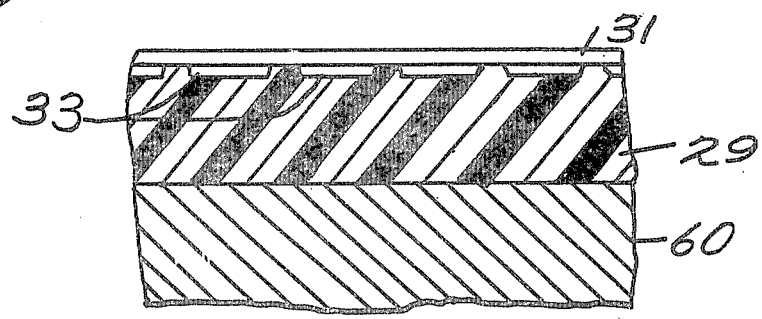
FIG. 4 is a cutaway side section view, illustrated in an enlarged scale, of the apparatus of FIG. 3.

FIGS. 3 and 4 represent the preferred embodiment of the apparatus of the present invention. As illustrated, an insulating strip 29, formed, for instance, of ceramic or high temperature resistant plastic, has a groove 35 formed through the center thereof with a plurality of transverse grooves 33 of relatively small size being formed along the length of the insulating strip 29. Positioned over the insulating strip 29 is a heater band or strip 31 which preferably is formed of Titanium Alloy 6AL4V having a thickness of 0.30 mm and a width of 25 mm. This strip, as aforementioned in connection with discussion of the embodiment of FIG. 2, initially is strained at room temperature to a level greater than the maximum strain due to heat in order to maintain the position of the strip in the same location with respect to the thermoplastic bead during the hot mashing operation.

In the embodiment of FIG. 3, ambient air is sucked in through the grooves 33 by means of a vacuum pump (not shown) which establishes a reduced air pressure level of 0.2 atmospheres. By sucking cool ambient air in through the grooves 33, a more uniform distribution of air about the strip 31 and the mashed bead is created, and hence a more uniform cooling of the strip 31 and the mashed thermoplastic material is achieved.

The groove 35 should have a relatively small width in order to provide support for the strip 31, and accordingly the groove must be deep in order to channel the sucked in air from each of the grooves 33 to the vacuum pump. In addition the grooves 33 should be sufficiently wide to present a large cooling area to the strip 31 but should not be so wide that the strip 31 is not given adequate support.

In the preferred embodiment the grooves 33 are 1.7 mm wide and only 0.17 mm deep, with each groove separated by a 0.5 mm land. This groove structure is designed to keep the bending stress in the strip 31 small and at the same time to present a relatively large area of the strip to the cooling air. At the same time, during the heating cycle, the grooves act as insulators preventing a large heat transfer to the insulator 29. The central trough 25 is deep and narrow so that it presents very little surface area to the strip 31 which might induce transverse bending stresses while at the same time has a sufficiently large crosssectional area to conduct the air from grooves 33 to the vacuum pump.

Figure 5:
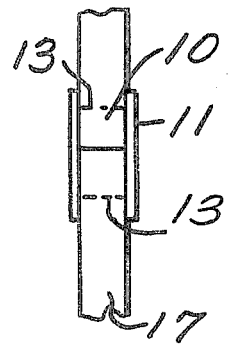
FIG. 5 is an enlarged section view of a weld made in accordance with the process of the present invention.

Using the embodiment of FIG. 2 or FIGS. 3 and 4, when electricity is conducted through the strip 21 or 31 it becomes sufficiently hot to bring the bead 11 illustrated in FIG. 1 to about or above its fusion or melting temperature. The support 20 for the insulator 19 or 29 and the strip 21 or 31 forces the heated strip against the bead to mash the bead against the weld area until substantially flat. The reheated bead material then becomes bonded to the plastic of the weld area as illustrated in FIG. 5 to form an improved weld joint. The joint of FIG. 5 is shown out of scale in order to clearly illustrate how the mashed bead forms a thin extra layer of bonded plastic material at the weld junctions.

Figure 6:
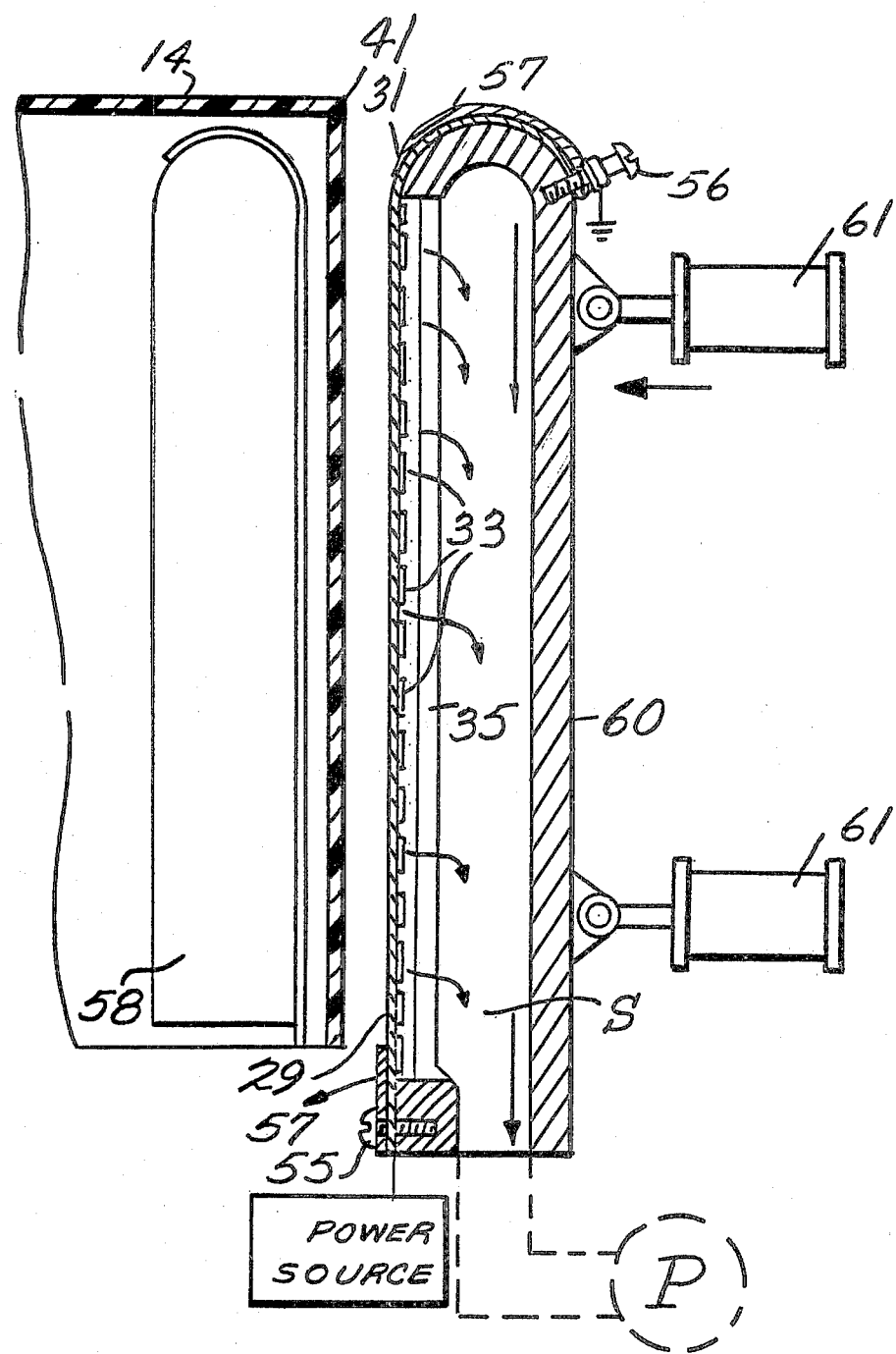
FIG. 6 is a cross-section view of a simplified apparatus using the embodiment of FIG. 3.

Turn now to FIG. 6 which is a simplified cross-sectional view of an apparatus for making battery jars which use the embodiment of FIG. 3. The strip 31 is disposed over insulator material 29 which, in turn is supported on a steel frame 60 which defines an enclosed space S. The space S is in communication with vacuum pump P and opens to trough 35, which in turn communicates with grooves 33. When the vacuum pump is actuated, it draws air under reduced pressure over the strip 31 and the welded junction area and acts to cool both. A copper coating 57 (shown in exaggerated form for clarity) is disposed on strip 31 on those areas of strip 31 which do not contact the plastic material to prevent the strip from overheating in these areas.

The strip 31 must be maintained under strain as indicated during the aforementioned discussion of FIG. 2. Screws 55 and 56 schematically depict one set of means for effecting this strain; but obviously there are many recognized equivalents which can be used instead. On turning the screw 56, an end of strip 31 is wound, thereby to provide the necessary strain on strip 31. As shown in FIG. 6, the insulator material 29 on which strip 31 is supported is disposed on a flat surface. However, the surface which supports the insulator material need not be flat but may have a surface which conforms to the surface of thermoplastic workpiece at the welded junction. Thus, if two thermoplastic pipes are welded together the surface will be annular or cylindrical conformation. A piston and cylinder arrangement actuates the framework 60 to provide contact between the weld junction 41.

A second apparatus 58 is illustrated in schematic form on the opposite side of the junction 41 of the plastic material 14 and serves to heat and mash the bead formed at the other side of the junction 41.

EXAMPLE

In operation, the embodiment of FIGS. 3 and 4 using the apparatus of FIG. 6 was applied to making a battery jar of a propylene-ethylene copolymer blend, of the type represented by FIGS. 7-9.

The elongated battery jar of FIGS. 8 and 9 8 comprises two end members 37 and 39, as illustrated in FIG. 7, each of which is open at the top thereof and has an elongated open side and three elongated closed sides. The distance from the surface defining the elongated open side of each member to its opposed closed side is at least several times smaller than the distance from the top to the bottom thereof. Typically, the distance between the open side and the opposed side is ¼ to 1/10 the distance from the top to the bottom of members 37 and 39. Each end member 37 and 39 has a wall thickness which is substantially the same from the top to the bottom thereof; i.e., there is no taper or draft from top to bottom and each of the end members 37 and 39 is a mirror image of the other. The end members 37 and 39 are heat welded at the respective elongated ends to form the battery jar—illustrated in FIGS. 8 and 9.

The manner and method of making the battery jar end members 37 and 39 is disclosed in copending U.S. patent application Ser. No. 648,738 of James S. Hardigg filed Jan. 13, 1976 now U.S. Pat. No. 4,118,265, the subject matter of which is incorporated herein by reference thereto.

The primary requirements for a battery jar are that it be resistant to the battery acid, have no leaks, have substantial dimensional accuracy, be resistant to shrinkage when the battery is overheated, have high impact strength to withstand accidents during battery manufacture and use, have uniform width and length from top to bottom, that is, no draft, have straight sides which are not bowed out or in, and have a capacity to bend and/or deform during handling in order to prevent the fracture thereof.

As aforementioned as the respective edges of end section members 37 and 39, illustrated in FIG. 7, are heated to the fusion temperature and then joined to one another to form a weld, the fused plastic material forms beads 11 on the inside and outside of the jar of the type illustrated in FIG. 1 and FIGS. 8 and 9. After the welded junction including the beads has cooled, the insulator 29 and band 21 illustrated in FIG. 3 are positioned along both the inside and outside weld area against the beads formed during the initial welding step by using an apparatus of the type illustrated in FIG. 6.

The Titanium Alloy strip 21 is then heated over a time interval ranging from 2.5 seconds to over 20 seconds while in pressing engagement with the beads. The beads thereby fuse and become flattened against the heated weld area 13 illustrated in FIG. 1 to thereby form a flattened weld joint as illustrated in FIG. 5. The strip 21 and the mashed bead are then cooled by drawing air at room temperature through the grooves and the trough formed in the insulating strip 29. After the mashed bead has cooled sufficiently to no longer adhere to the strip 21, the strip and insulating support were removed to form the final welded battery jar.

It has been discovered that when longer heating and cooling times are used, the dart-impact strength of the welded joints increases. However, it has also been discovered that as longer heating cycle times are used, the battery jars warp, particularly at the upper end adjacent to the open end of the jar, i.e., the jars bow inward or outward to an unacceptable extent. The warpage resulting from long heating times apparently is due to the shrinkage which occurs in the plastic material after heating it to the melting point. Thus, the material in the area over which the bead is mashed is brought to or near the melting point thereof and accordingly shrinks during cooling, whereas the surrounding material which has not been reheated does not shrink.

One technique for overcoming the warpage problem is to preheat the welded battery jars to 180°-200° F. prior to the mashing process. This causes the entire jar to shrink somewhat upon cooling, and accordingly the differential in shrinkage between the material adjacent to the weld and the remainder of the battery jar is substantially reduced. This technique, however, is not desirable on a production line basis since the lengthened cooling cycle required with preheated jars substantially increases the total manufacturing time of the battery jars. It has therefore been discovered that by using a very short heating time in the range of 3 to 4 seconds and heating the Titanium Alloy strips to a higher temperature, an improved weld having high dart-impact strength with substantially no warpage results. The extent of warpage was further reduced by utilizing a technique of drawing relatively cool ambient air in under the strip 31 which has the effect of cooling the battery jar material adjacent to the strips. This results in a narrower zone of heated plastic material subject to shrinkage which in turn reduces the distortion in the walls of the battery jar due to shrinkage. Thus, by using a relatively short heating time cycle and drawing air in from the area surrounding the heated plastic material, the overall cycle time for treating the welded junction falls below 30 seconds.

While the present invention has been disclosed in connection with the preferred embodiments thereof, it should be understood that there may be other modifications to the invention which fall within the spirit and scope thereof as defined by the appended claims.

What is claimed is:

1. A method of bonding two pieces of thermoplastic material to one another to form an article, consisting essentially of the steps of:
   heating at least one edge of each of said two pieces to at least about the fusion temperature of said thermoplastic material;
   then butt joining said heated edges to one another under pressure to thereby form a welded junction, said pressure causing a bead of plastic material to be formed on at least one side of said welded junction; and
   improving the physical and dielectric strength of the material of said welded junction by subjecting the welded junction to a reheat treatment to cause the material to become molten, and quenching the molten material to reduce its temperature to a temperature at least below said fusion temperature.

2. The method according to claim 1 wherein pressure is applied normal to the welded junction during said reheating step in order to cause the material at the welded junction to become substantially flat.

3. The method according to claim 1 wherein said bead is reheated and pressed against said welded junction until substantially flat.

4. The method according to claim 1 wherein said bead is removed from said junction prior to said step of reheating.

5. A method of making an elongated thermoplastic battery jar having a first end member which is open at the top and closed at the bottom thereof and which has an elongated open side and three elongated closed sides, the distance from the surface defining the open side to its opposed closed side being at least several times smaller than the distance from the top to the bottom thereof, and a second open sided elongated end member being a mirror image of said first end member, the method consisting essentially of the steps of:
   heating the edge which defines the elongated open side of said first open sided end member to at least its fusion temperature;
   heating the edge which defines the elongated open side of said second open sided end member to at least its fusion temperature;
   butt joining said end members at the respective heated edges thereof to form a welded junction, a bead of plastic material being formed along the axis of said welded junction; and
   improving the physical and dielectric strength of the material at the welded junction by reheating the material at the welded junction to a temperature at least about the fusion temperature of the thermoplastic material, and rapidly cooling the heated material at the welded junction to a temperature below the fusion temperature thereof to thereby form a battery jar.

6. The method of claim 5 wherein said reheating step is undertaken at an elevated pressure whereby said bead is mashed against said welded junction.

7. A method of making an article of manufacture which is formed of at least two thermoplastic members which are welded together to form said article, wherein an edge of a first of said members is welded to an edge of a second of said members, and wherein the edge of said first member is a mirror image configuration of said edge of said second member, the method consisting essentially of the steps of:
   heating the edge of said first member to at least its fusion temperature;
   heating the edge of said second member to at least its fusion temperature;
   butt joining said heated edges of said members to form a welded junction, a bead of plastic material being formed at said welded junction; and
   improving the physical and dielectric strength of said material at the welded junction by reheating said bead to at least its fusion temperature, and rapidly cooling said reheated material at the welded junction to a temperature below the fusion temperature thereof to thereby form said article of manufacture.

8. The method of claim 7 wherein said reheating step is undertaken at elevated pressure whereby said bead is mashed against said welded junction until substantially flat.

9. The method of claim 7 wherein said article of manufacture is a thermoplastic container.

10. The method of claim 7 wherein said article is a thermoplastic pipe conduit.

11. A method of bonding two pieces of thermoplastic material to one another to provide improved strength at the junction of said pieces, said pieces each having at least one edge surface which mates with an edge of said other piece, the method consisting essentially of the steps of:
   separately heating said at least one edge of each of said first and second pieces to about their fusion temperatures;
   joining said heated edges to one another in an non-overlapping relationship under pressure to thereby form a welded junction, said pressure causing a bead of plastic material to be formed on at least one side of said welded junction; and
   improving the physical and dielectric strength of said material at the welded junction by reheating said welded junction to at least about its fusion temperature to cause the material at the welded junction to become molten, and rapidly cooling said molten material to a temperature at least below said fusion temperature.

12. The method according to claim 11 wherein said pressure is applied normal to the welded junction during said reheating step in order to cause the material at the welded junction to become substantially flat.

13. The method according to claim 11 wherein said bead is pressed against said welded junction until substantially flat during said reheating step.

14. The method according to claim 11 wherein said bead is removed from said junction prior to said reheating step.

15. A method of bonding two pieces of plastic material, taken from the group of crystalline thermoplastic materials, to one another to form an article, the method essentially consisting of the steps of:

heating at least one edge of each of said two pieces to at least about the fusion temperature of said crystalline thermoplastic material;

then butt joining said heated edges to one another under pressure to thereby form a welded junction, said pressure causing a bead of plastic material to be formed on at least one side of said welded junction; and improving the physical and dielectric strength of the material at the welded junction by subjecting the welded junction to a reheat treatment to cause the material to become molten, and quenching the molten material to reduce its temperature to a temperature at least below said fusion temperture.

* * * * *